United States Patent [19]
Yoshimura et al.

[11] Patent Number: 5,510,898
[45] Date of Patent: Apr. 23, 1996

[54] INFORMATION SIGNAL RECORDING APPARATUS

[75] Inventors: Katsuji Yoshimura; Mitsuru Owada, both of Kanagawa, Japan

[73] Assignee: Canon Kabushiki Kaisha, Tokyo, Japan

[21] Appl. No.: 488,955

[22] Filed: Jun. 7, 1995

Related U.S. Application Data

[63] Continuation of Ser. No. 278,564, Jul. 21, 1994, abandoned, which is a continuation of Ser. No. 139,332, Oct. 18, 1993, abandoned, which is a continuation of Ser. No. 926, Jan. 6, 1993, abandoned, which is a continuation of Ser. No. 758,280, Aug. 27, 1991, abandoned, which is a continuation of Ser. No. 267,574, Nov. 7, 1988, abandoned.

[30] Foreign Application Priority Data

Nov. 26, 1987 [JP] Japan ................... 62-298452
Nov. 26, 1987 [JP] Japan ................... 62-298453
Nov. 26, 1987 [JP] Japan ................... 62-298454

[51] Int. Cl.⁶ .................................................. H04N 9/80
[52] U.S. Cl. ................................................... 358/320
[58] Field of Search ............................ 358/310, 320, 358/323, 324, 327, 326, 330, 337, 339, 340, 312, 335; 360/36.1, 36.2

[56] References Cited

U.S. PATENT DOCUMENTS

| | | | |
|---|---|---|---|
| 3,626,087 | 12/1971 | Tomioka | 358/330 |
| 3,969,755 | 7/1976 | Arimura et al. | 358/330 |
| 4,186,411 | 1/1980 | Numakura | 358/328 |
| 4,193,084 | 3/1980 | Yamagiwa et al. | 358/328 |
| 4,217,603 | 8/1980 | Hjortzberg | 358/310 |
| 4,242,699 | 12/1980 | Kobayashi et al. | 358/330 |
| 4,459,620 | 7/1984 | Abe et al. | 358/326 |
| 4,626,927 | 12/1986 | Hirota et al. | 358/340 |
| 4,688,105 | 8/1987 | Bloch et al. | 358/335 |
| 4,724,491 | 2/1988 | Lambert | 358/310 |
| 4,761,691 | 8/1988 | Stearns | 358/320 |
| 4,764,812 | 8/1988 | Hamley | 358/320 |
| 4,907,099 | 3/1990 | Nagai et al. | 358/312 |

OTHER PUBLICATIONS

Video User's Handbook, Prentice–Hall, Inc., New Jersey, 1980, pp. 260, 321–333.

*Primary Examiner*—Donald E. McElheny, Jr.
*Attorney, Agent, or Firm*—Robin, Blecker, Daley and Driscoll

[57] ABSTRACT

Apparatus for processing signals having time base variations comprises: time base variation correction circuitry for correcting time-base variations existing in a signal input thereto and having an input terminal and an output terminal, the output terminal providing signals which are time base variation corrected; a recording and/or reproducing unit having an input terminal for receiving a signal to be recorded on a recording medium and an output terminal for providing a signal reproduced from the recording medium; and switch circuitry operable in a recording mode for connecting the output terminal of the time base variation correction circuitry to the input terminal of the recording and/or reproducing unit and in a reproducing mode for connecting the output terminal of the recording and/or reproducing unit to the input terminal of the time base variation correcting circuitry. The processing apparatus is further adapted for processing for recording a first signal having time base variations therein or a second signal not having time base variations therein, wherein in the processing of the second signal, the time base variation correction circuitry is bypassed and the second signal is furnished directly to a recording unit.

13 Claims, 4 Drawing Sheets

INFORMATION SIGNAL RECORDING APPARATUS

This is a continuation application under 37 CFR 1.62 of prior application Ser. No. 08/278,564, filed Jul. 21, 1994, abandoned, which is a continuation of Ser. No. 08/139,332, filed Oct. 18, 1993, abandoned, which is a continuation of Ser. No. 08/000,926, filed Jan. 6, 1993, abandoned, which is a continuation of Ser. No. 07/758,280, filed Aug. 27, 1991, abandoned, which is a continuation of Ser. No. 07/267,574, filed Nov. 7, 1988, abandoned.

BACKGROUND OF THE INVENTION

1. Field of the Invention

This invention relates to an information signal recording apparatus having a function of correcting a time base error included in the information signal.

2. Description of the Related Art

The output of a magnetic head of, for example, a magnetic recording and reproducing apparatus includes a time base error due to the uneven rotation of the magnetic head, fluctuations in the traveling speed of tape or the like. If a reproduced video signal is supplied to a monitor without correction, the error results in transverse swaying of images on the picture plane or fluctuations of chromaticity. To avoid this, a time base error correction circuit is provided for correcting the time base of the video signal. Meanwhile, with respect to a video display, time base error correction is not absolutely necessary for a luminance signal. However, time base error correction is indispensable to a chrominance signal as a time base error causes uneven colors, etc. It has been practiced, therefore, to carry out time base error correction at the time of performing a frequency converting process for bringing into its original state the chrominance signal which is low-band converted for recording.

With a video signal reproduced by the magnetic recording and reproducing apparatus arranged in the above stated manner, the luminance signal component of the video signal includes some time base error while the chrominance signal component thereof may not include any time base error. Therefore, in carrying out dubbing, for example, the time base error included in the luminance signal component of the original video signal causes the luminance signal component of the duplicate record to include the time base error. Then, in reproducing the duplicate record obtained by dubbing, the time base error recurs in a cumulatively enhanced manner. This results in a great degradation of the reproduced picture. Such time-base error accumulation eventually makes the time base error incorrigible at the time of frequency converting the low-band converted chrominance signal back to its original state.

The known time base correction circuits for correcting the above stated time base error include a so-called time base corrector. The time base corrector is arranged in principle to correct the time base error by varying, according to the degree of the error, the delay time of a variable delay line. However, the variable delay line brings about some deterioration in the frequency characteristic and the S/N ratio of the video signal. While the degree of the signal deterioration is not much and presents no problem in obtaining the reproduced video signal from a magnetic tape, it is greatly detrimental to a broadcasting signal which is very stable including no time base error.

SUMMARY OF THE INVENTION

It is a general object of this invention to provide an information signal recording apparatus which is capable of solving the above stated problems.

It is a more specific object of the invention to provide an information signal recording apparatus which is capable of recording on a recording medium even such an information signal that includes a time base error by correcting the time base error before recording.

Under this object, an information signal recording apparatus arranged as an embodiment of the invention to selectively input either an information signal reproduced from a recording medium or an information signal generated by another apparatus and to record the input information signal on another recording medium, comprises: time base variation correction means, arranged to input an information signal, for correcting any time base variations occurring in the input information signal; information signal recording means, arranged to input an information signal, for recording the input information signal on a recording medium; and supply means, arranged to selectively input either an information signal reproduced from another recording medium or an information signal generated by another apparatus, for supplying the information signal generated by the other apparatus to the information signal recording means as it is, and supplying the information signal reproduced from the other recording medium to the information signal recording means after any time base variations included in the information signal have been corrected by the time base variation correction means.

It is another object of the invention to provide an information signal recording and reproducing apparatus which is arranged in a simplified state to record an information signal on a recording medium after correcting any time base error included therein, to reproduce an information signal recorded on a recording medium and to output the reproduced information signal after correcting any time base error included in the signal.

Under that object, an information signal recording and reproducing apparatus arranged according to this invention to record an information signal on a recording medium and to reproduce an information signal recorded on a recording medium comprises: time base variation correction means, arranged to input an information signal, for correcting any time base variations occurring in the input information signal; information recording means, arranged to input an information signal, for recording the input information signal on a recording medium; information signal reproducing means for reproducing an information signal recorded on the recording medium to output the information signal; and supply means for supplying, when recording an information signal on the recording medium, an input information signal to the time base variation correction means to supply to the information signal recording means the information signal whose time base variations have been corrected by the time base variation correction means, and for supplying, when reproducing an information signal from the recording medium, the information signal reproduced by the information signal reproducing means to the time base variation correction means to output the information signal whose time base variations have been corrected by the time base variation correction means.

The above and other objects and features of the invention will become apparent from the following detailed description of embodiments thereof taken in connection with the accompanying drawings:

3

DETAILED DESCRIPTION OF THE PREFERRED EMBODIMENTS

Figure 1:
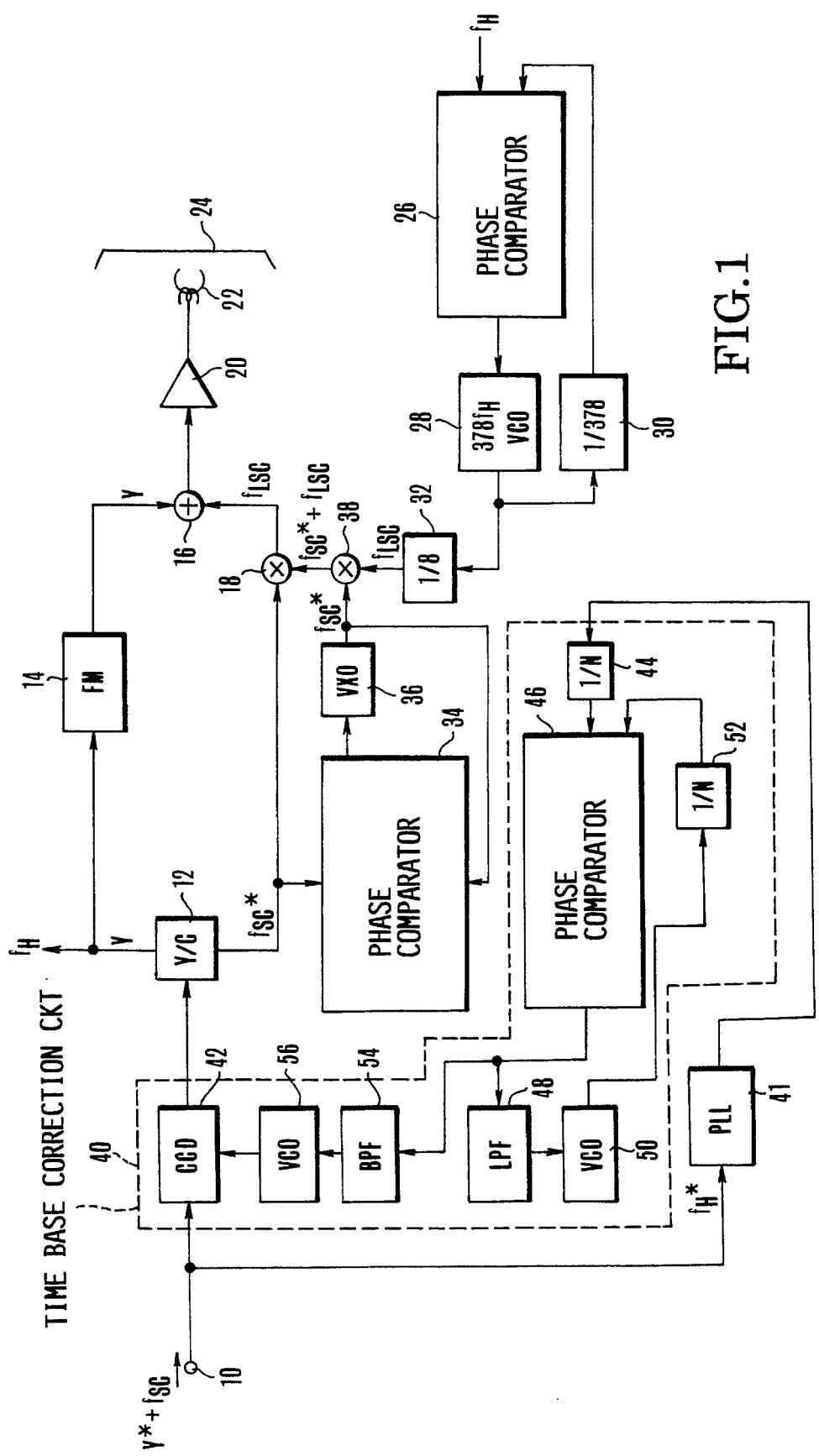
FIG. 1 is a block diagram showing the arrangement of the recording system of a recording and reproducing apparatus embodying this invention.
Figure 2:
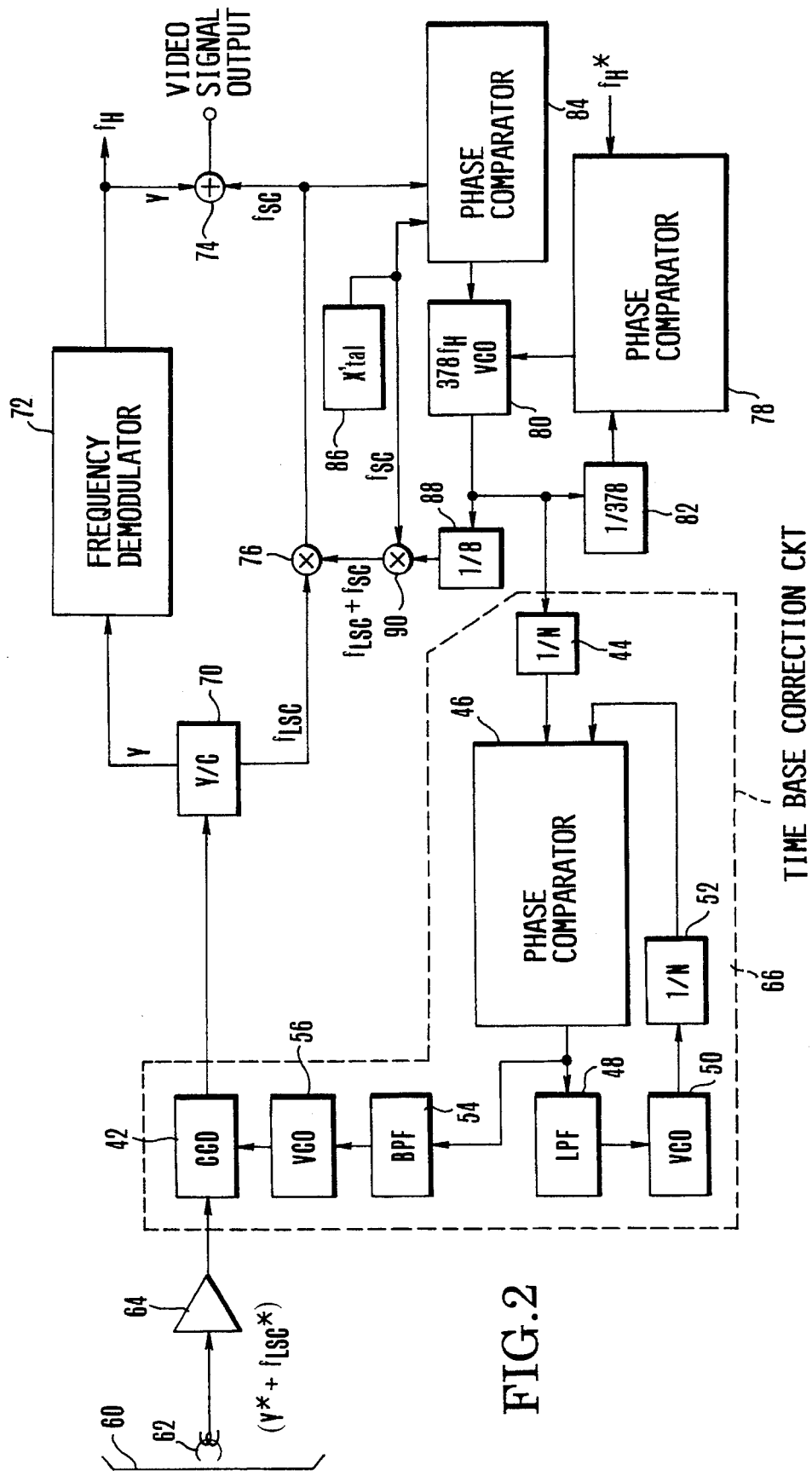
FIG. 2 is a block diagram showing the arrangement of the reproducing system of the embodiment of the invention.

The following describes an embodiment of this invention with reference to the accompanying drawings: FIG. 1 shows the recording system of a recording and reproducing apparatus which is arranged according to this invention as an embodiment thereof. FIG. 2 shows the reproducing system of the same apparatus. The illustrations include a luminance signal Y; a carrier chrominance signal or its frequency fsc; a low-band carrier chrominance signal or its frequency fLsc; and a horizontal synchronizing signal or its frequency fH. A mark * which is suffixed to these reference symbols indicates the existence of a time base error.

The recording system of the recording and reproducing apparatus shown in FIG. 1 is arranged as follows: An input terminal 10 is assumed to receive from some other reproducing apparatus a video signal consisting of a luminance signal Y* which includes a time base error and a carrier chrominance signal fsc which has the time base error thereof already corrected. A time base correction circuit 40 is arranged to correct the time base error of the luminance signal Y* by means of a CCD 42 which serves within the circuit 40 as a variable delay element. Meanwhile, a time base error which is of the same value as the above stated time base error but is generated in the opposite direction is added to the carrier chrominance signal fsc before the signal fsc is produced from the time base correction circuit 40. The circuit 40 will be described in detail later herein.

The output of the time base correction circuit 40 is supplied to a Y/C separating circuit 12 to be divided into a luminance signal Y and a carrier chrominance signal fsc*. The signal Y is frequency modulated by a frequency modulator 14 and is applied to an adder 16. The carrier chrominance signal fsc* is applied to an multiplier 18. To the multiplier 18 is also applied a carrier (fsc*+fLsc) which is reflecting the time base error of the input luminance signal Y*. The multiplier 18 is thus arranged to produce a low-band carrier chrominance signal fLsc which does not include any time base error. At the adder 16, the luminance signal Y which is frequency modulated by the frequency modulator 14 is added to and superimposed on the low-band carrier chrominance signal fLsc output from the multiplier 18. The output of the adder 16 is applied via a recording amplifier 20 to a recording head 22 to be recorded on a magnetic tape 24. In other words, the input video signal has its time base error corrected before it is recorded on the magnetic tape 24.

A PLL circuit is formed jointly by a phase comparator 26, a VCO 28 and a frequency divider 30. In this PLL circuit, the phase comparator 26 is arranged to phase compare the output of the frequency divider 30 with a horizontal synchronizing signal fH which does not have any time base error and is taken out from the luminance signal. Y separated by the Y/C separating circuit 12. A phase difference signal which is thus obtained by the phase comparator 26 is applied to the VCO 28. The VCO 28 oscillates at a frequency of 378 fH in accordance with the phase difference signal. The frequency divider 30 frequency divides the output of the VCO 28 into 1/378 and feeds it back to the phase comparator 26. As a result, the output of the VCO 28 includes no time base error. The output of the VCO 28 is then frequency divided by another frequency divider 32 into ⅛ to obtain the carrier of the frequency fLsc. A phase comparator 34 and a VXO 36 also jointly form a PLL circuit. The phase comparator 34 is arranged to phase compare the carrier chrominance signal fsc* output from the Y/C separating circuit 12 with the output of the VXO 36. The VXO 36 is arranged to produce a signal which is synchronized with the carrier chrominance signal fsc* (and which will be expressed as a carrier fsc* for the sake of description). The multiplier 38 performs a multiplying operation on the carrier fsc* output from the VXO 36 and the carrier fLsc output from the frequency divider 32 to obtain a carrier (fsc*+fLsc). The carrier (fsc*+fLsc) is applied to another multiplier 18. As a result, the multiplier 18 produces a low-band carrier chrominance signal fLsc which is free from any time base error.

Next, the time base correction circuit 40 operates as follows: A PLL circuit 41 is arranged similarly to the above stated PLL circuit which consists of the phase comparator 26, the VCO 28 and the frequency divider 30. The PLL circuit 41 extracts a horizontal synchronizing signal fH* from the luminance signal Y* which is received at the input terminal 10 and includes a time base error therein. The circuit 41 then produces a carrier which is of a frequency 378 fH and includes a time base error. A frequency divider 44 divides the frequency of the output of the PLL circuit 41 into 1/N. A phase comparator 46, an LPF 48, a VCO 50 and a frequency divider 52 for frequency dividing into 1/N jointly form a PLL circuit, which operates as follows: The phase comparator 46 phase compares the carrier which is produced from the frequency divider 44 and includes a time base error with a carrier produced from the frequency divider 52. A phase error signal which is thus obtained and is produced from the phase comparator 46 is applied via the LPF 48 to the control input terminal of the VCO 50. The VCO 50 oscillates at the frequency of 378 fH. The output of the VCO 50 is applied to the frequency divider 52. The output of the phase comparator 46 includes the time base error of the input luminance signal. This output is applied to the control input terminal of a VCO 56 via a BPF 54. Therefore, the frequency of a clock signal produced from the VCO 56 also includes a time base error. Under the control of this clock signal, the CCD 42 acts on the input multiplex signal (Y*+fsc) in the direction of the time base to offset the time base error of the luminance signal Y*. Meanwhile, the carrier chrominance signal comes to include a time base error generated in a direction opposite to the above stated time base error.

In case that the input terminal 10 receives a video signal which does not include any time base error, the recording system operates as follows: In this case, no time base error is included in the output of the PLL circuit 41. Therefore, the time base correction circuit 40 simply delays the luminance signal and the carrier chrominance signal of the input video signal for a given period of time. The luminance signal and the carrier chrominance signal produced from the Y/C separating circuit 12 do not include any time base error. The signals supplied to the phase comparators 26 and 34 also include no time base error. The signal to be recorded on the magnetic tape 24 also includes no time base error.

FIG. 2 shows the reproducing system of the recording and reproducing apparatus. The reproducing system is arranged as follows: The illustration includes a magnetic tape 60; a reproducing head 62 and a reproduction amplifier 64. The reproduction amplifier 64 produces a video signal (Y*+fLsc*) which includes a time base error. The reproducing system includes a time base correction circuit 66 which is arranged in exactly the same manner as the circuit 40 of FIG. 1. However, the circuit 66 is arranged to receive a clock signal which includes a time base error from an AFC/APC circuit, which will be described later. The time base correction circuit 66 includes a CCD 42 which is arranged to remove the time base variations of the signal produced from the reproduction amplifier 64. As a result, the time base correction circuit 66 produces a video signal (Y+fLsc). The signal produced from the circuit 66 is supplied to a Y/C separating circuit 70. The circuit 70 divides the signal into a luminance signal Y and a low-band carrier chrominance signal fLsc. The luminance signal Y is demodulated by a frequency demodulator 72 and is then applied to an adder 74. The low-band carrier chrominance signal fLsc is supplied to a multiplier 76. The multiplier 76 multiplies the signal fLsc by a frequency signal (fLsc+fsc) which is obtained on the basis of a horizontal synchronizing signal fH taken out from the frequency demodulated luminance signal. As a result of this multiplying operation, a carrier chrominance signal fsc is produced from the multiplier 76. The signal fsc is supplied to the adder 74. The adder 74 multiplexes the carrier chrominance signal fsc with the frequency demodulated luminance signal Y. As a result, the adder 74 produces a reproduced video signal with its time base variations corrected.

The above stated AFC circuit is composed of a phase comparator 78, a VCO 80 and a frequency divider 82. A horizontal synchronizing signal fH* having a time base error is applied to the phase comparator 78 of the AFC circuit. The APC circuit is composed of a phase comparator 84, a quartz crystal oscillator 86 and a VCO 80. A color burst signal which includes a phase error is supplied to the phase comparator 84 of the APC circuit. The VCO 80 then supplies a clock signal including a time base error to the frequency divider 82, a frequency divider 88 and the frequency divider 44 of the time base correction circuit 66. The frequency dividers 82 and 88 are arranged to operate at frequency dividing rates of 1/378 and 1/8 respectively. A multiplier 90 is arranged to multiply the carrier of the frequency fsc produced from the quartz crystal oscillator 86 by the output of the frequency divider 88 to obtain a carrier having a frequency of (fLsc+fsc).

Figure 3:
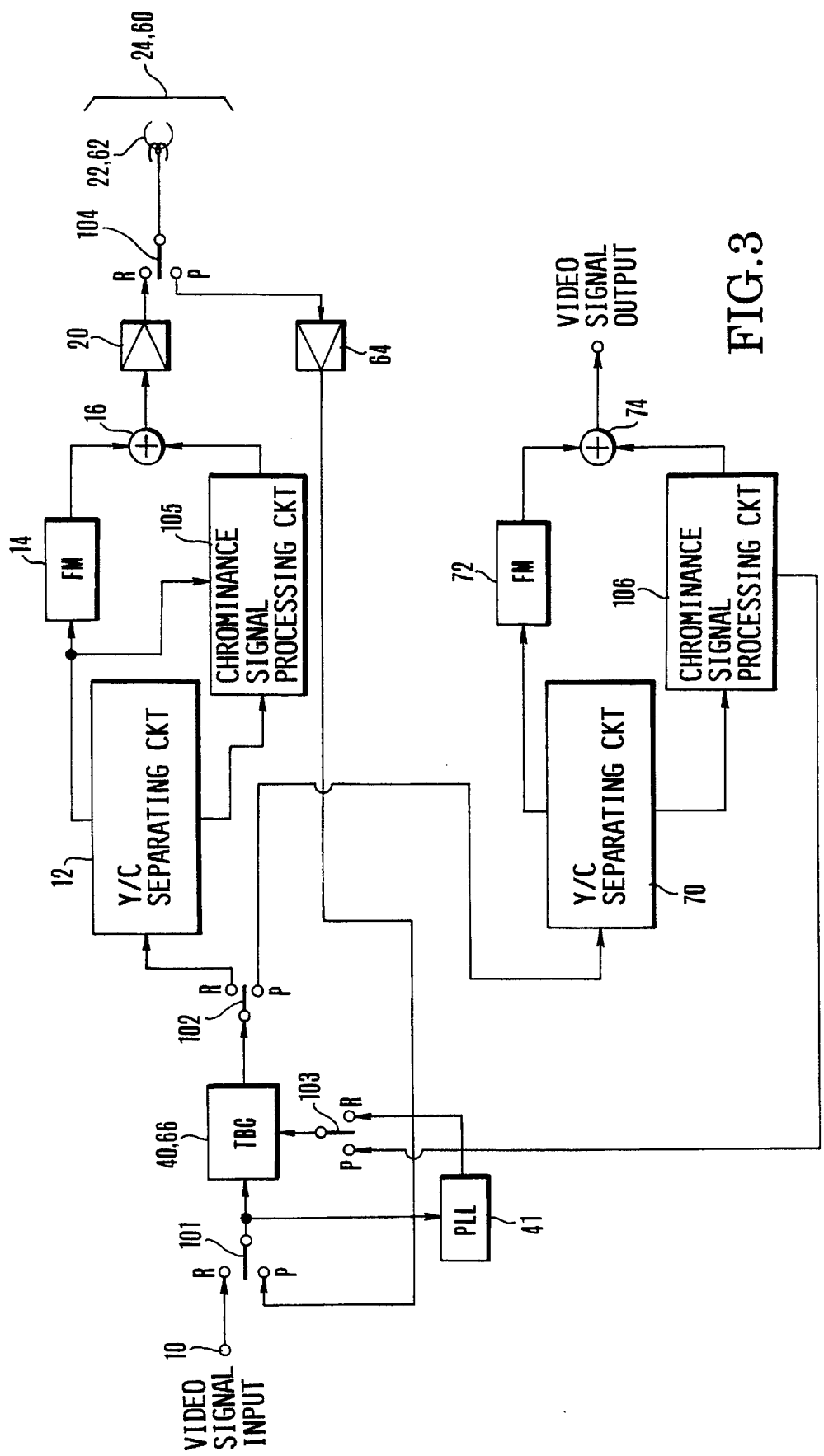
FIG. 3 is a block diagram showing the basic arrangement of the recording and reproducing apparatus comprising in combination the recording system of FIG. 1 and the reproducing system of FIG. 2.

FIG. 3 is a block diagram showing the basic arrangement of a recording/reproducing system comprising in combination the recording system of FIG. 1 and the reproducing system of FIG. 2. The same component parts as those of FIGS. 1 and 2 are indicated by the same reference numerals and symbols. Referring to FIG. 3, a chrominance signal processing circuit 105 is composed of the circuit elements 18, 26, 28, 30, 32, 34 and 36 of FIG. 1. Another chrominance signal processing circuit 106 is composed of the circuit elements 76, 78, 80, 82, 84, 86, 88 and 90 of FIG. 2. Switches 101, 102, 103 and 104 have their connecting positions on the sides R during recording and on other sides P during reproduction. As apparent from the drawing, the time base correction circuit 40 or 66 and the magnetic head 22 or 62 are arranged to be used both for recording and reproduction.

When an incoming video signal has a time base error in its luminance signal, the embodiment corrects the time base error before recording the video signal on the recording medium. Therefore, the time base error will never be accumulated even through repeated dubbing. In reproduction, the time base errors of the luminance and chrominance signals are corrected before they are produced, so that a recorded video signal can be reproduced at a high degree of quality.

Figure 4:
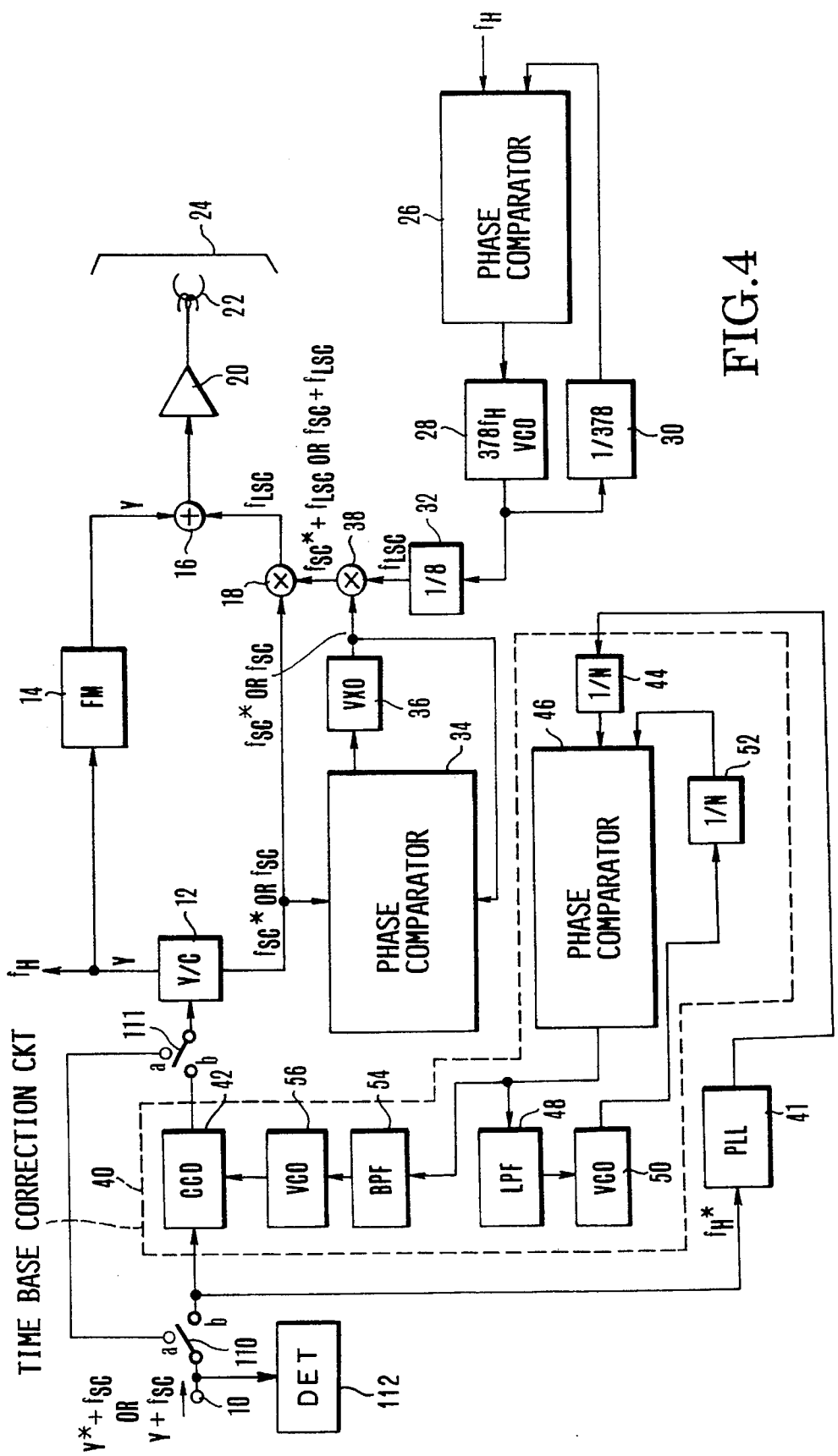
FIG. 4 is a block diagram showing the arrangement of a recording apparatus arranged as another embodiment of the invention.

FIG. 4 shows in a block diagram a recording apparatus which is arranged according to this invention as another embodiment thereof. In FIG. 4, the component parts which are similar to those of FIG. 1 are indicated by the same reference numerals and the details of them are omitted from the following description:

Referring to FIG. 4, an input terminal 10 is arranged to receive from some other reproducing apparatus a composite video signal Consisting of a luminance signal Y* which includes a time base error therein and a carrier chrominance signal fsc which has the time base error thereof already corrected. The input terminal 10 also may receive such a composite video signal as a broadcasting signal that includes no time base error. The apparatus includes a time base correction circuit 40 and switches 110 and 111. The switches 110 and 111 are provided for a detour around the time base correction circuit 40. More specifically, the connecting positions of these switches 110 and 111 are on the side of their contacts "a" when a video signal having no time base error is received at the input terminal 10 and are on the side of other contacts "b" when the input terminal 10 receives a video signal having some time base error.

In case that the luminance signal component of the incoming video signal includes a time base error, the embodiment operates as follows: In this case, the position of each of the switches 110 and 111 is at the contact "b". This allows the video signal (Y*+fsc) coming from the input terminal 10 to be supplied via the switch 110 to the time base correction circuit 40. Then, like in the case of FIG. 1, a CCD 42 which is arranged to serve as a variable delay element corrects the time base error of the luminance signal Y*. At the same time, to the carrier chrominance signal fsc is added a time base error which is of the same degree as the above stated error but is in the opposite error generating direction. The output of the time base correction circuit 40 is supplied via the switch 111 to a Y/C separating circuit 12. The circuit 12 then divides and separates the output of the circuit 40 into a luminance signal Y and a carrier chrominance signal fsc*. The luminance signal Y is frequency modulated by a frequency modulator 14. The frequency modulated luminance signal Y is supplied to an adder 16. Meanwhile the carrier chrominance signal fsc* is applied to a multiplier 18. To the multiplier 18 is also applied, like in the case of FIG. 1, a carrier (fsc*+fLsc) reflecting the time base error of the input luminance signal Y*. Therefore, the multiplier 18 produces a low-band carrier chrominance signal fLsc which is free from any time base error. The low-band carrier chrominance signal fLsc is supplied from the multiplier 18 to the adder 16 to be added to the frequency modulated luminance signal Y which is supplied from the frequency modulator 14 to the adder 16. The adder 16 adds these inputs together into a video signal. The output of the adder 16 is supplied to a recording head 22 via a recording amplifier 20 to be recorded on a magnetic tape 24. In other words, the video signal is recorded on the magnetic tape 24 after completion of correction of the time base error thereof.

When a video signal having no time base error is supplied to the input terminal 10, the embodiment operates as follows: In that event, the connecting positions of the switches 110 and 111 are on the side of their contacts "a". This allows the input video signal to be applied directly to the Y/C separating circuit 12. The circuit 12 then divides and separates the video signal into a luminance signal and a chrominance signal. Both the signals thus separated by the Y/C separating circuit 12 include no time base error. The output of the multiplier 38 and that of the multiplier 18 also include no time base error. Therefore, a video signal having no time base error is recorded on the magnetic tape 24.

In the foregoing, the switches 110 and 111 have been described as if they are arranged to be manually operated. However, these switches may be arranged to be automatically operated. For example, the presence or absence of a time base error is detected at a suitable signal processing stage, e.g., detector DET 112 of FIG. 4, and the switches 110 and 111 are automatically operated according to the result of the detection. In the case of automatic operation of the switches 110 and 111, they of course should be arranged to be not too readily operated in the event of a time base error varying in a short period of time.

The embodiment described is arranged to correct any time base error included in an input video signal before recording the video signal on a recording medium. This effectively eliminates the possibility of accumulation of the time base error through dubbing or the like. Further, the embodiment is arranged to have such an input video signal that has no time base error allowed to be processed without passing through the time base correction means. That arrangement, therefore, prevents the frequency characteristic or the S/N ratio of the video signal from being unnecessarily degraded by the time base correction means.

What is claimed is:

1. A composite color video signal processing apparatus for processing a composite color video signal containing a luminance signal and a color information signal, comprising:

(A) recording/reproducing signal processing means arranged to receive said composite color video signal and to transform the received composite color video signal into a component color video signal consisted of both the luminance signal and color information signal and to perform either a recording signal processing or a reproducing signal processing to both the luminance signal and color information signal, and to transform back into the composite color video signal the component color video signal processed by either the recording signal processing or the reproducing signal processing, thereby outputting the composite color video signal;

(B) recording/reproducing means arranged to record on a recording medium the composite color video signal processed by the recording signal processing outputted from said recording/reproducing signal processing means or reproduce the composite color video signal recorded on said recording medium, thereby supplying the reproduced composite color video signal to said recording/reproducing signal processing means;

(C) time-base variation correction means arranged to receive a composite color video signal add to correct a time-base; variation generated on the received composite color video signal: and (D) switching means arranged to switch connection between said time-base variation correcting means and said recording means, in such a manner that in a case where a composite color video signal supplied from other reproducing apparatus is input, said composite color video signal is supplied to said time-base variation correction means and to correct said time variation generated on said composite color video signal in said time-base variation correction means, thereby recording on a recording medium the composite color video signal processed by the recording signal processing of said recording/reproducing signal processing means and then reproducing it and, in another case where a composite color video signal processed by the reproducing signal processing in the recording/reproducing signal processing means is input, said composite color video signal is supplied to said time-base variation correction means and said time-base variation generated on said composite color video signal is corrected by said time-base variation correction means and then to output it.

2. An apparatus according to claim 1, wherein said recording/reproducing signal processing means includes:

(1) first signal separating means arranged to receive said composite color video signal, separate the luminance signal and color video signal, and to output the separated luminance signal and color information signal;

(2) first modulating means arranged to receive the luminance signal separated by said first signal separating means and to modulate the received luminance signal into a first frequency band, thereby forming and outputting a modulated luminance signal;

(3) second modulating means arranged to receive the color information signal separated by said first signal separating means and to modulate the received color information signal into a second frequency band different from the first frequency band, thereby forming and outputting a modulated color information signal; and (4) first multiplex means arranged to multiplex the modulated luminance signal outputted from said first modulating means with the modulated color information signal outputted from said second modulating means, thereby forming the composite color video recording signal to be recorded into said recording medium and outputting the formed composite color video recording signal.

3. An apparatus according to claim 2, wherein said recording/reproducing signal processing means further includes:

(5) second signal separating means arranged to receive said color video recording signal, separate said modulated luminance signal and color information signal from the received composite color video recording signal and to output the separated modulated luminance signal and color information signal, independently;

(6) first demodulating means arranged to receive the modulated luminance signal separated in said second signal separating means and to demodulate the received modulated luminance signal, thereby forming and outputting the luminance signal;

(7) second demodulating means arranged to receive the modulated color information signal separated in said second signal separating means and to demodulate the received modulated color information signal, thereby forming and outputting said color information signal; and (8) second multiplex means arranged to multiplex the luminance signal outputted from said first demodulating means with the color information signal outputted from said second demodulating means, thereby forming and outputting the formed composite color video signal.

4. An apparatus according to claim 3, wherein said second modulating means includes:
(A) first frequency signal generating means arranged to receive the color information signal separated by said first signal separating means and to generate a first frequency signal synchronized in phase with the received color information signal;
(B) second frequency signal generating means arranged to receive the luminance signal separated by means of said first signal separating means and to generate a second frequency signal synchronized with the received luminance signal; and
(C) first balanced modulation means arranged to receive the color information signal separated by means of said first signal separating means to effect a balanced modulation of the received color information signal into the second frequency band by using the first frequency signal generated by said first frequency signal generating means and the second frequency signal generated by said second frequency signal generating means, thereby forming and outputting said modulated color information signal.

5. An apparatus according to claim 4, wherein said second demodulating means includes:
(A) third frequency signal generating means arranged to receive the luminance signal outputted from said first demodulating means and to generate a third frequency signal synchronized with the received luminance signal;
(B) reference signal generating means for generating a reference signal; and
(C) second balanced modulation means arranged to receive the modulated color information signal separated by said second signal separating means to effect a balanced modulation of the received modulated color information signal into the original frequency band by using the third frequency signal generated by said third frequency signal generating means and the reference frequency signal generated by said reference frequency signal generating means, thereby forming and outputting said color information signal.

6. A composite color video signal processing apparatus for processing a composite color video signal, containing both a luminance signal and a color information signal, comprising:
(A) time-base variation correction means, arranged to receive a composite color video signal and to correct a time-base variation generated on the received composite color video signal;
(B) recording means arranged to receive said composite color video signal, transform the received composite color video signal into a component color video signal composed of a luminance signal and a color information signal, and to perform a recording signal processing on the luminance signal and color information signal, respectively, thereby recording on a recording medium the composite color video signal processed by said recording signal processing; and
(C) switching means arranged to switch connection between said time-base variation correcting means and said recording means, in such a manner that in a case where a composite color video signal supplied from other reproducing apparatus is input, said composite color video signal is supplied to said time-base variation correction means and said time-base variation generated on said composite color video signal is corrected by said time-base variation correction means, thereby recording on the recording medium the composite color video signal processed by a recording signal processing in said recording means and, in another case where a composite color video signal received from other receiving apparatus is input, said composite color video signal is directly supplied to said recording means without supplying to said time-base variation correction means, thereby recording on the recording medium the composite color video signal processed by the recording signal processing in said recording means.

7. An apparatus according to claim 6, wherein said recording means includes:
(a) signal separating means arranged to receive the composite video signal, separate the luminance signal and the color information signal from the received composite video signal, and output the separated luminance signal and color information signal independently;
(b) first modulating means arranged to receive the luminance signal outputted from said signal separating means and to modulate the received luminance signal into a first frequency band, thereby forming and outputting a modulated luminance signal;
(c) second modulating means arranged to receive the color information signal outputted from said signal separating means and to modulate the received color information signal into a second frequency band different from the first frequency band, thereby forming and outputting a modulated color information signal; and
(d) frequency multiplexing video signal forming means arranged to frequency multiplex the modulated luminance signal outputted from said first modulating means and the modulated color information signal outputted from said second modulating means, thereby forming a frequency multiplexed video signal.

8. An apparatus according to claim 7, wherein said second modulating means includes:
(a) first frequency signal generating means arranged to receive the color information signal outputted from said signal separating means and to generate a first frequency signal synchronized in phase with the received color information signal;
(b) second frequency signal generating means arranged to receive the luminance signal outputted from said signal separating means and to generate a second frequency signal synchronized in phase with a synchronizing signal included in the received luminance signal; and
(c) balanced modulation means arranged to receive the color information signal outputted from said signal separating means to effect a balanced modulation of the received color information signal into the second frequency band by using the first frequency signal generated by said frequency signal generating means and the second frequency signal generated by said second frequency signal generating means, thereby forming and outputting a modulated color information signal.

9. A composite video signal processing apparatus for processing a composite color video signal containing both a luminance signal and a color information signal, comprising:
(A) time-base variation correction means, arranged to receive a composite color video signal and to correct a time-base variation generated on the received composite video signal;

(B) recording means arranged to receive said composite color video signal, transform the received composite color video signal into a component color video signal composed of a luminance signal and a color information signal, and to perform a recording signal processing on the luminance signal and color information signal, respectively, thereby recording on a recording medium the composite color video signal process by said recording signal processing; and (C) switching means arranged to switch connection between said time-base variation correcting means and said recording means, in such a manner that in a case where a composite color video signal supplied from other reproducing apparatus is input, said composite color video signal is supplied to said time-base variation correction means and said time-base variation generated on said composite color video signal is corrected by said time-base variation correction means, thereby recording on the recording medium the composite color video signal processed by the recording signal processing in said recording means and, in another case where a composite color video signal received from other video camera apparatus is input, said composite color video signal is directly supplied to said recording means without supplying to said time-base variation correction means, thereby recording on the recording medium the composite color video signal processed by the recording signal processing in said recording means.

10. An apparatus according to claim 9, wherein said recording means includes:

(a) signal separating means arranged to receive the composite video signal, separate the luminance signal and the color information signal from the received composite video signal, and output the separated luminance signal and color information signal independently;

(b) first modulating means arranged to receive the luminance signal outputted from said signal separating means and to modulate the received luminance signal into a first frequency band, thereby forming and outputting a modulated luminance signal;

(c) second modulating means arranged to receive the color information signal outputted from said signal separating means and to modulate the received color information signal into a second frequency band different from the first frequency band, thereby forming and outputting a modulated color information; and (d) frequency multiplexing video signal forming means arranged to frequency multiplex the modulated luminance signal outputted from said first modulating means and the modulated color information signal outputted from said second modulating means, thereby forming a frequency multiplexed video signal.

11. An apparatus according to claim 10, wherein said second modulating means includes:

(a) first frequency signal generating means arranged to receive the color information signal outputted from said signal separating means and to generate a first frequency signal synchronized in phase with the received color information signal;

(b) second frequency signal generating means arranged to receive the luminance signal outputted from said signal separating means and to generate a second frequency signal synchronized in phase with a synchronizing signal included in the received luminance signal; and (c) balanced modulation means arranged to receive the color information signal outputted from said signal separating means to effect a balanced modulation of the received color information signal into the second frequency band by using the first frequency signal generated by said first frequency signal generating means and the second frequency signal generated by said second frequency signal generating means, thereby forming and outputting a modulated color information signal.

12. An apparatus according to claim 9, wherein said recording medium includes a video tape for recording the video signal.

13. An apparatus according to claim 9, wherein said recording medium includes a video disk for recording the video signal.

* * * * *

UNITED STATES PATENT AND TRADEMARK OFFICE
CERTIFICATE OF CORRECTION

PATENT NO. : 5,510,898
DATED : April 23, 1996
INVENTOR(S) : Katsuji Yoshimura and Mitsuru Owada It is certified that error appears in the above-indentified patent and that said Letters Patent is hereby corrected as shown below:

Col. 4, line 2, change "signal.Y" to -- signal Y --.

Col. 6, line 17, change "Consisting" to -- consisting --.

Col. 7, line 60, change "time-base;" to -- time-base --.

Col. 11, line 10, change "process" to -- processed --.

Signed and Sealed this

Eighth Day of October, 1996

Attest:

BRUCE LEHMAN

Attesting Officer     Commissioner of Patents and Trademarks